United States Patent [19]
Ma et al.

[11] Patent Number: 6,147,796
[45] Date of Patent: Nov. 14, 2000

[54] METHOD FOR DETERMINING TRANSMISSION PARAMETERS FOR THE DATA CHANNELS OF A WDM OPTICAL COMMUNICATION SYSTEM

[75] Inventors: Xiabing Ma; Morten Nissov; Howard David Kidorf, all of Monmouth County, N.J.

[73] Assignee: Tyco Submarine Systems Ltd., Morristown, N.J.

[21] Appl. No.: 09/228,732

[22] Filed: Jan. 12, 1999

[51] Int. Cl.$^7$ .................................................. H01S 3/00
[52] U.S. Cl. ........................ 359/341; 359/110; 359/124
[58] Field of Search .................................. 359/110, 124, 359/341

[56] References Cited

U.S. PATENT DOCUMENTS

| | | | |
|---|---|---|---|
| 5,877,878 | 3/1999 | Horiuchi et al. ...................... | 359/110 |
| 5,943,147 | 8/1999 | Vanoli et al. ......................... | 359/110 |
| 6,025,948 | 2/2000 | Gautheron ............................. | 359/177 |
| 6,038,356 | 3/2000 | Kerfoot, III et al. ................. | 385/24 |
| 6,064,501 | 5/2000 | Roberts et al. ....................... | 359/110 |

*Primary Examiner*—Mark Hellner

[57] ABSTRACT

A method is provided for determining at least one optical transmission parameter for achieving a prescribed operating characteristic of an optical transmission system that includes at least one optical amplifier. The optical transmission parameter to be determined may include, for example, the channel wavelengths that are employed, the channel powers, and/or the spacing between adjacent channels.

The method begins by transmitting through the transmission system a plurality of saturating optical wavelengths such that the optical amplifiers operate at a desired operating point within a region of gain compression. A plurality of probe wavelengths are transmitted through the transmission system. The probe wavelengths have a total power insufficient to substantially change the desired operating point of the optical amplifiers. The plurality of probe wavelengths are characterized by at least one optical transmission parameter. Next, an initial operating characteristic of the transmission system is determined. The optical transmission parameter of the plurality of probe wavelengths is then varied to determine a second operating characteristic of the transmission system. The steps of determining an initial operating characteristic and varying the optical transmission parameter is repeated until a resulting operating characteristic of the transmission system is substantially equal to the prescribed operating characteristic.

10 Claims, 2 Drawing Sheets ent in the fiber without amplification or regeneration is limited by the loss and dispersion associated with the optical fiber. To transmit optical signals over long distances, the lightwave systems may include a number of repeaters periodically located along the fiber route from the transmit terminal to the receive terminal. Each repeater boosts the weak received signal to compensate for the transmission losses which occurred from the last repeater. Prior to the widespread availability of efficient optical amplifiers, many systems converted the optical signals into electrical signals for amplification by conventional electrical amplifiers. The amplified electrical signals were then reconverted to the optical domain, for further distribution along the optical communication path. The advent of reliable and low cost optical amplifiers has obviated the need to convert signals into the electrical domain for amplification.

METHOD FOR DETERMINING TRANSMISSION PARAMETERS FOR THE DATA CHANNELS OF A WDM OPTICAL COMMUNICATION SYSTEM

FIELD OF THE INVENTION

The present invention relates generally to optical communication systems, and more particularly to a method for determining appropriate transmission parameters of the data channels in a WDM optical communication system in which a large number of channels are employed.

BACKGROUND OF THE INVENTION

Commercial lightwave systems use optical fibers to carry large amounts of multiplexed digital data over long distances from a transmit terminal to a receive terminal. The maximum distance that the data can be transmitted in the fiber without amplification or regeneration is limited by the loss and dispersion associated with the optical fiber. To transmit optical signals over long distances, the lightwave systems may include a number of repeaters periodically located along the fiber route from the transmit terminal to the receive terminal. Each repeater boosts the weak received signal to compensate for the transmission losses which occurred from the last repeater. Prior to the widespread availability of efficient optical amplifiers, many systems converted the optical signals into electrical signals for amplification by conventional electrical amplifiers. The amplified electrical signals were then reconverted to the optical domain, for further distribution along the optical communication path. The advent of reliable and low cost optical amplifiers has obviated the need to convert signals into the electrical domain for amplification.

Optical amplifiers, such as rare earth doped optical fiber amplifiers, require a source of pump energy. In a rare earth doped optical fiber amplifier, for example, a dedicated pump laser is coupled to the doped fiber for exciting the active medium (rare earth element) within the amplifier. At the same time, a communication signal is passed through the doped fiber. The doped fiber exhibits gain at the wavelength of the communication signal, providing the desired amplification. If the doped optical fiber is doped with erbium, for example, pump energy may be provided at a wavelength of 1485 nm or 980 nm, which coincide with the absorption peaks of erbium.

Signals on optical fiber transmission lines characterized by large bit rate distance products, such as undersea or transcontinental terrestrial lightwave transmission systems and which employ optical amplifiers are subject to a host of impairments that accumulate along its length. The source of these impairments within a single data channel include amplified spontaneous emission (ASE) noise generated in the erbium-doped fiber amplifiers (EDFAs), polarization dependent gain caused by hole burning in the EDFAs, polarization dependent loss (PDL) in the passive components, nonlinear effects resulting from the dependence of the refractive index of single-mode fiber on the intensity of the light propagating therethrough, and chromatic dispersion which causes different optical frequencies to travel at different group velocities. In addition, for wavelength division multiplexed (WDM) systems in which a plurality of optical channels are transmitted on the same optical fiber, crosstalk between channels caused by the fiber's nonlinear index or incomplete channel selection at the receiving terminal must be considered.

The degree to which the impairments effect the operating characteristics of the transmission system will be determined in part by transmission parameters such as the channel wavelength, channel power and channel spacing. Accordingly, in a WDM system employing a large number of data channels, it becomes necessary to vary the transmission parameters for all the channels to determine the set of transmission parameters that achieves an optical transmission system having optimal or near optimal operating characteristics. Unfortunately, as the number of channels increases, the combination of different transmission parameters that need to be examined becomes unduly large.

Accordingly, it would be desirable to provide a method for determining the appropriate transmission parameters for the various data channels without the need for examining the transmission system's operating characteristics corresponding to each and every permutation of the data channels' transmission parameters.

SUMMARY OF THE INVENTION

In accordance with the present invention, a method is provided for determining at least one optical transmission parameter for achieving a prescribed operating characteristic of an optical transmission system that includes at least one optical amplifier. The optical transmission parameter to be determined may include, for example, the channel wavelengths that are employed, the channel powers, and/or the spacing between adjacent channels.

The method begins by transmitting through the transmission system a plurality of saturating optical wavelengths such that the optical amplifiers operate at a desired operating point within a region of gain compression. A plurality of probe wavelengths are transmitted through the transmission system. The probe wavelengths have a total power insufficient to substantially change the desired operating point of the optical amplifiers. The plurality of probe wavelengths are characterized by at least one optical transmission parameter. Next, an initial operating characteristic of the transmission system is determined. The optical transmission parameter of the plurality of probe wavelengths is then varied to determine a second operating characteristic of the transmission system. The steps of determining an initial operating characteristic and varying the optical transmission parameter is repeated until a resulting operating characteristic of the transmission system is substantially equal to the prescribed operating characteristic.

In one embodiment of the invention, only a small number of probe wavelengths are employed relative to the total number of data channels that are employed. Because only a small number of probe tones are used, the present invention advantageously allows a larger fraction of all possible permutations of the transmission parameters to be examined than would otherwise be the case if all possible permutations of all the data channels were required to be examined.

DETAILED DESCRIPTION

Figure 1:
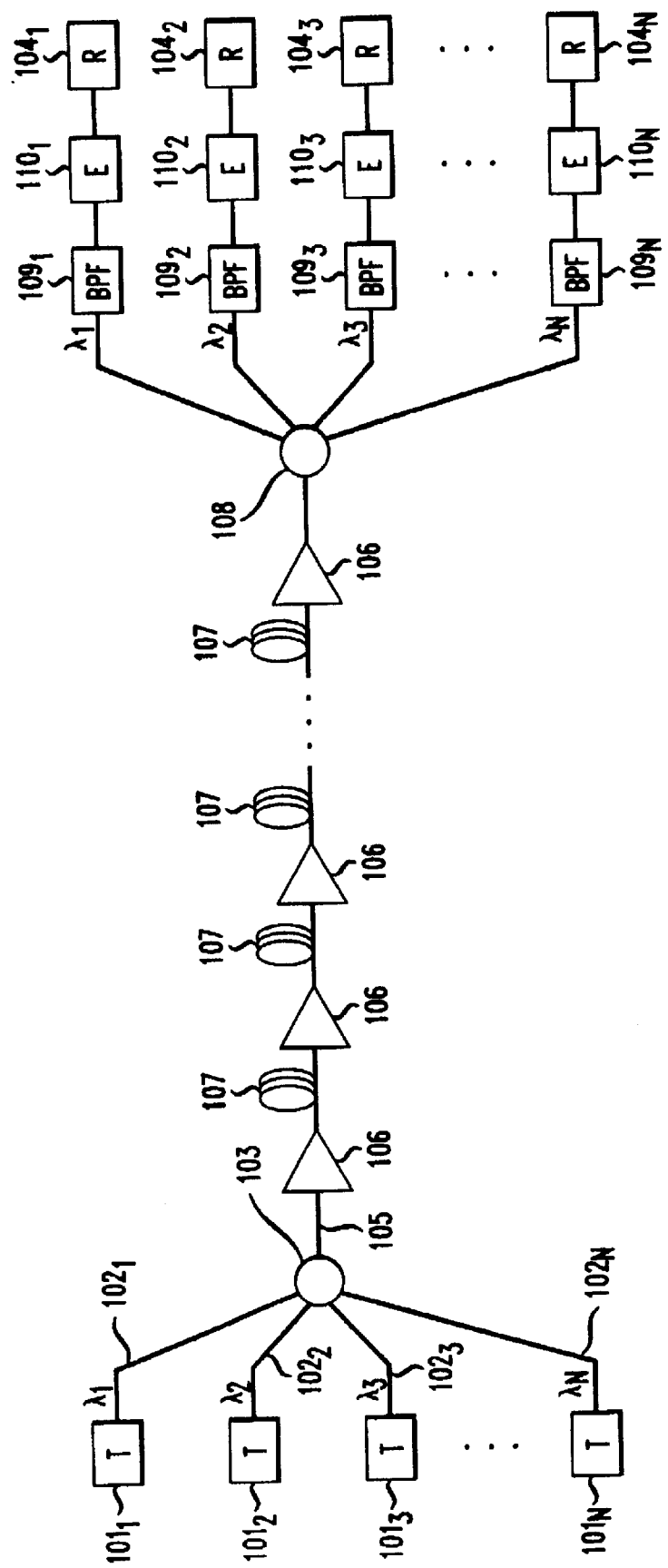
FIG. 1 shows a simplified block diagram of an exemplary wavelength division multiplexed (WDM) transmission system in accordance with the present invention.

FIG. 1 shows a simplified block diagram of an exemplary wavelength division multiplexed (WDM) transmission system in accordance with the present invention. The transmission system serves to transmit a plurality of optical channels over a single path from a transmitting terminal to a remotely located receiving terminal. Specifically, a plurality of transmitting terminals $101_1, 101_2, \ldots 101_N$ transmit data signals on a set of wavelengths $\lambda_1, \lambda_2, \ldots \lambda_N$, which are respectively carried on a plurality of paths $102_1, 102_2, \ldots 102_N$. The data channels are combined onto a single path by a signal combiner 103. The functionality of the signal combiner can be performed by a variety of devices such as a wavelength independent directional coupler or a wavelength router of the type described in U.S. Pat. Nos. 5,002,350 and 5,412,744. The combined set of optical channels are transmitted to a plurality of remote receiving terminals 104 via optical transmission path 105, which could, for example, include optical amplifiers 106, such as erbium-doped fiber amplifiers, optically coupling individual spans of single-mode optical fibers 107. A 1×N splitter 108 and a plurality of optical bandpass filters 109 demultiplexes the optical channels at the remote or receiving end of the system. As those skilled in the art will appreciate, the functionality of splitter 108 and bandpass filters 109 may be achieved in a number of different ways. For example, the previously mentioned wavelength router that is employed as a multiplexer in the transmitter may also be used as a demultiplexer in the receiver. While FIG. 1 depicts a unidirectional transmission system, it should be noted that if a bidirectional communication system is to be employed, two distinct transmission paths are used to carry the bidirectional communication. In such a case optical amplifiers are provided in each transmission path. Moreover, each of the terminals 101 and 104 include a transmitter and a receiver. Moreover, while only four optical amplifier pairs are depicted in FIG. 1 for clarity of discussion, it should be understood by those skilled in the art that the present invention finds application in transmission paths of all lengths having many additional (or fewer) sets of such repeaters.

The optical amplifiers 106 provide optical gain to overcome attenuation in the transmission path. Each optical amplifier 106 contains a length of doped fiber that provides a gain medium, an energy source that pumps the fiber to provide gain, and a means of coupling the pump energy into the doped fiber without interfering with the signal being amplified. These components of the optical amplifiers are shown in greater detail in FIG. 2.

Once a rare-earth doped optical amplifier is pumped into an excited state, it can produce both optical gain and optical noise. Specifically, gain may be produced through emission stimulated by a passing signal photon and noise may be produced by radiative spontaneous decay. Thus, a properly designed optical amplifier achieves an optimum tradeoff between signal gain and noise production while maintaining the output power and the compression specified for a given transmission system.

Figure 2:
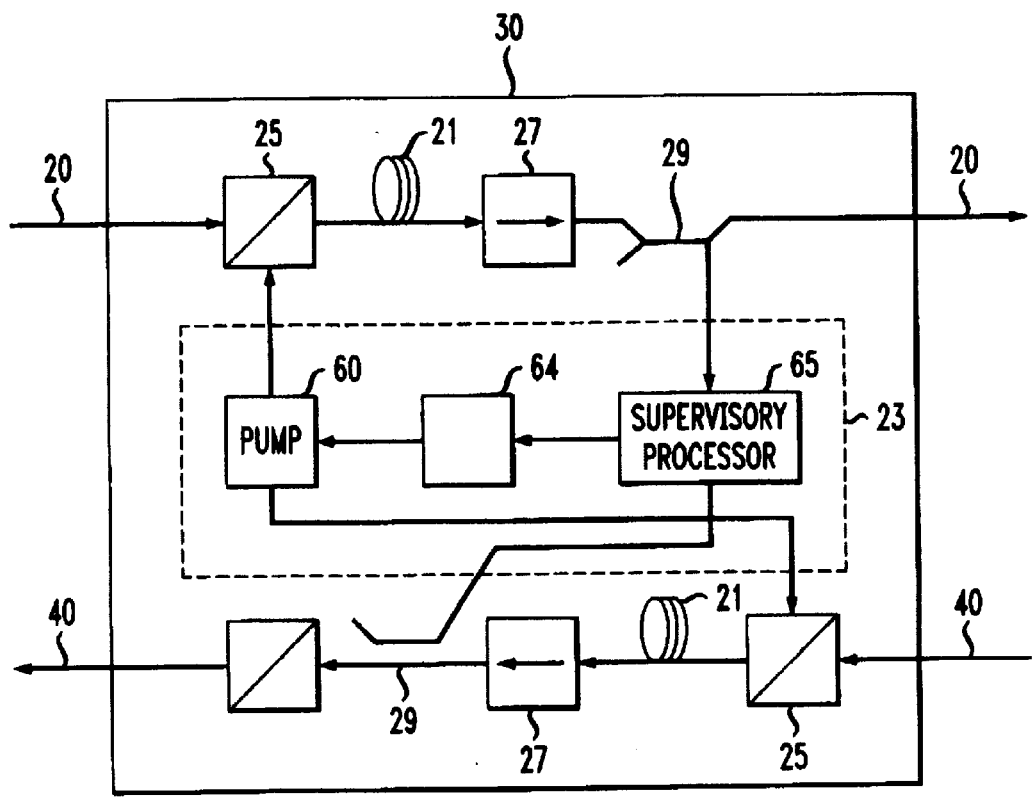
FIG. 2 shows the details of an exemplary repeater which houses a pair of optical amplifiers for supplying gain to opposite-going transmission paths.

FIG. 2 shows a pair of optical amplifiers for supplying gain to transmission paths 20 and 40. In undersea communication systems a pair of such optical amplifiers supporting opposite-traveling signals is housed in a single unit 30 known as a repeater. Referring to FIG. 2, each optical amplifier includes a rare-earth doped optical fiber 21, such as an erbium doped fiber (EDF), coupled to a source of optical pump energy 60 via a coupler 25 such as a wavelength division multiplexer (WDM). An optical isolator 27 is typically located immediately downstream from each of the doped fibers. The isolator prevents amplified spontaneous emission from traveling back upstream and disrupting system stability by causing the amplifiers to oscillate. The signals being transmitted through the repeater 30 are in optical form. There is no intermediate conversion to electrical form.

In a bidirectional transmission system such as shown in FIG. 2, pump unit 23 provides the optical pump energy for both transmission directions of the amplifier pair. The pump unit 23 includes pump laser 60, pump controller 64 and supervisory/command response (SCR) processor 65. Pump laser 60 generates an optical pump beam at a suitable wavelength for producing amplification in EDF 21. For erbium doped fibers, pump wavelengths in the neighborhood of 1485 nm or 980 nm are suitable. The pump controller 64 comprises a comparator and feedback circuit for powering and controlling the pump laser 60. The SCR circuit 65 receives a portion of the optical signal tapped by couplers 29. The pump controller 64, responsive to signals from the SCR processor 65, applies current to pump laser 60 to adjust the total output power generated by the pump laser 60.

The design of an optical transmission system must provide control of the optical power level, must address control of noise accumulation, must provide an adequate optical bandwidth for the data channels, and must minimize pulse distortion caused by chromatic dispersion and nonlinear effects. For example, it might be anticipated that by decreasing the average output power of the transmitters 101 the data signal would be impaired because of a corresponding decrease in the gain of the EDF. However, in practice this is not a serious problem because of the self-healing nature of optical transmission systems employing optical amplifiers. Specifically, optical amplifiers are typically operated in a state of compression or gain saturation in which a decrease in optical input power is compensated by increased amplifier gain. That is, in compression the amplifiers regulate the optical power of the signals propagating through the optical fiber. A series of optical amplifiers extending along a transmission path and operating in compression compensates for system degradations through a process of automatic gain adjustment. As a result, the optical output power from the amplifier remains at a substantially constant level even as the optical input power undergoes fluctuations. In other words, once the operating point (i.e., the point on the gain versus input power curve) of the optical amplifier has been determined, its output power will remain substantially constant, provided that the operating point corresponds to a state of compression or gain saturation. Accordingly, transmission systems of this type are designed to maintain the signal-to-noise ratio (SNR) of the data signal. Accordingly, a decrease in the output power of a given EDF will not adversely effect overall system performance because the decrease will be compensated by a gain increase in subsequent downstream amplifiers.

In designing a WDM transmission system having a large number of channels (e.g. 200 or more), the determination of optimal values of the pertinent transmission parameters becomes extremely complex. For example, at least three transmission parameters typically need to be selected for each channel, including the channel wavelength, the channel power, and the spacing between adjacent channels. These parameters will in part determine features of the transmission system such as the noise accumulation and pulse distortion, which impact the ultimate data rate and capacity of the system. Clearly, the number of possible permutations of these parameters is far too great to individually examine the performance of each and every possible arrangement.

In accordance with the present invention, a plurality of fixed saturating wavelengths are selected across the bandwidth in which the transmission system is to operate. The number of saturating wavelengths employed will typically be a small subset of the total number of channels to be used in the system. In the simplest case the saturating wavelengths will be evenly distributed over the operating bandwidth. However, this should not be construed as a limitation on the present invention and accordingly the saturating wavelengths may be distributed over the operating bandwidth in any convenient manner, whether uniform or nonuniform.

The total power contained in the saturating wavelengths is at least sufficient to drive the optical amplifiers into saturation so that they operate at or near their desired operating points. In practice, this requires that the total power of the saturating wavelengths should be sufficient to produce an output power from the optical amplifiers which is within a few percent of the output power produced when the optical amplifiers each operate at their respective desired operating points. The saturating wavelengths are used to ensure that the optical amplifiers have the same inversion level and gain shape that will result when the transmission system is operational.

Figure 3:
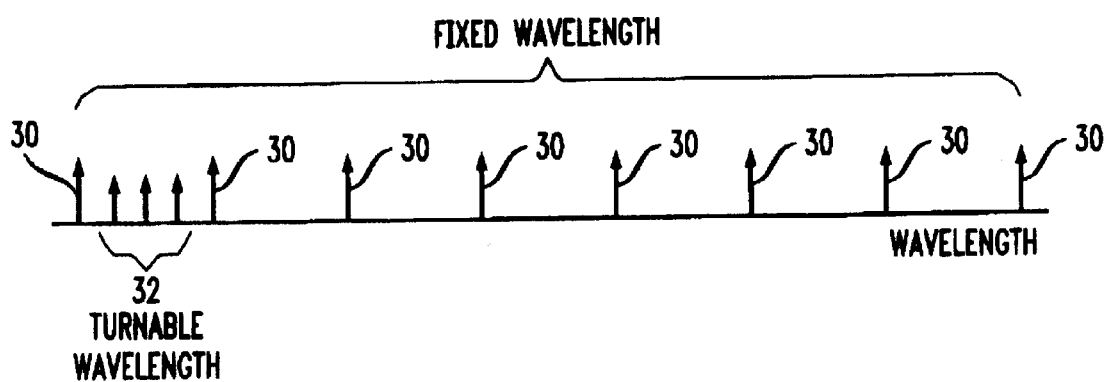
FIG. 3 shows a series of saturating wavelengths and probe wavelengths employed in accordance with the present invention.

Once the fixed saturating wavelengths have been chosen, a plurality of probe tones or wavelengths are employed to determine the appropriate values of the transmission parameters for the system being designed. The number of probe wavelengths employed is sufficiently small so that the performance of many different sets of transmission parameters can be tested. For example, FIG. 3 shows a series of eight fixed saturating wavelengths 30 distributed over the operating bandwidth of the system. Three probe tones 32 are also located within the operating bandwidth. As shown, the probe tones 32 are initially located between the first two saturating wavelengths.

The total power contained in the probe wavelengths is small in comparison to the total power in the saturating wavelengths. Specifically, the total power contained in the probe tones is maintained at a level sufficiently low so that the operating points of the optical amplifiers do not undergo substantial change. Accordingly, the inversion level and gain shape of the optical amplifiers will remain at their desired values, which are largely determined by the total power in the saturating wavelengths.

The probe tones serve as potential data channels in the transmission system. The transmission parameters of the probe tones are varied across the entire bandwidth to determine the operating characteristics of the system (e.g., effective bandwidth and the data rate associated therewith) for different values of the channel power, channel wavelength, and channel spacing. In this manner optimal or near-optimal values of the channel wavelengths, channel spacing and the power per channel can be determined. Because only a small number of probe tones are employed, the present invention advantageously allows a larger fraction of all possible permutations of the transmission parameters to be examined than would otherwise be the case if all possible permutations of all the data channels were required to be examined. Moreover, the present invention allows the ultimate capacity of a system to be determined by using only a small number of channels.

The present invention also advantageously allows the precise manner in which the probe tones are selected and varied to be determined independently from the particular transmission system being studied. That is, the transmission system does not dictate the procedure that must be used for its analysis. Thus, a given procedure may be used to design and test many different transmission systems.

Although various embodiments are specifically illustrated and described herein, it will be appreciated that modifications and variations of the present invention are covered by the above teachings and are within the purview of the appended claims without departing from the spirit and intended scope of the invention. For example, the present invention is applicable to a wide range of differently configured optical transmission systems.

What is claimed is:

1. A method for determining at least one optical transmission parameter for achieving a prescribed operating characteristic of an optical transmission system that includes at least one optical amplifier, said method comprising the steps of:

(a) transmitting through the transmission system a plurality of saturating optical wavelengths such that the optical amplifiers operate at a desired operating point within a region of gain compression;

(b) transmitting through the transmission system a plurality of probe wavelengths having a total power insufficient to substantially change the desired operating point of the optical amplifiers, said plurality of probe wavelengths being characterized by at least one optical transmission parameter;

(c) determining an initial operating characteristic of the transmission system;

(d) varying the at least one optical transmission parameter of the plurality of probe wavelengths to determine a second operating characteristic of the transmission system;

(e) repeating steps (c) and (d) until a resulting operating characteristic of the transmission system is substantially equal to the prescribed operating characteristic.

2. The method of claim 1 wherein said at least one optical transmission parameter is selected from the group consisting of channel wavelengths, channel powers, and a spacing between adjacent channels.

3. The method of claim 1 wherein said at least one optical transmission parameter includes channel wavelengths, a channel power for each probe wavelength and a channel spacing between adjacent probe wavelengths.

4. The method of claim 1 wherein said prescribed operating characteristic of the optical transmission system includes a maximum rate of data transmission.

5. The method of claim 4 wherein said prescribed operating characteristic of the optical transmission system includes a maximum rate of data transmission.

6. The method of claim 1 wherein said optical amplifier is a rare-earth doped optical amplifier.

7. The method of claim 6 wherein said rare-earth doped optical amplifier is an erbium doped optical amplifier.

8. The method of claim 1 wherein the optical transmission system has first and second optical transmission paths for supporting bidirectional communication and wherein each optical transmission path includes at least one optical amplifier.

9. The method of claim 1 wherein the plurality of saturating wavelengths are substantially fewer in number than the number of channels in a WDM optical signal supported by the optical transmission system.

10. The method of claim 9 wherein said saturating wavelengths are evenly distributed over an operating bandwidth of the transmission system.

* * * * *